Oct. 9, 1934.  J. A. SHAFER  1,975,869
SAFETY SUPPORTING MEANS FOR BRAKE BEAMS
Filed Jan. 27, 1933
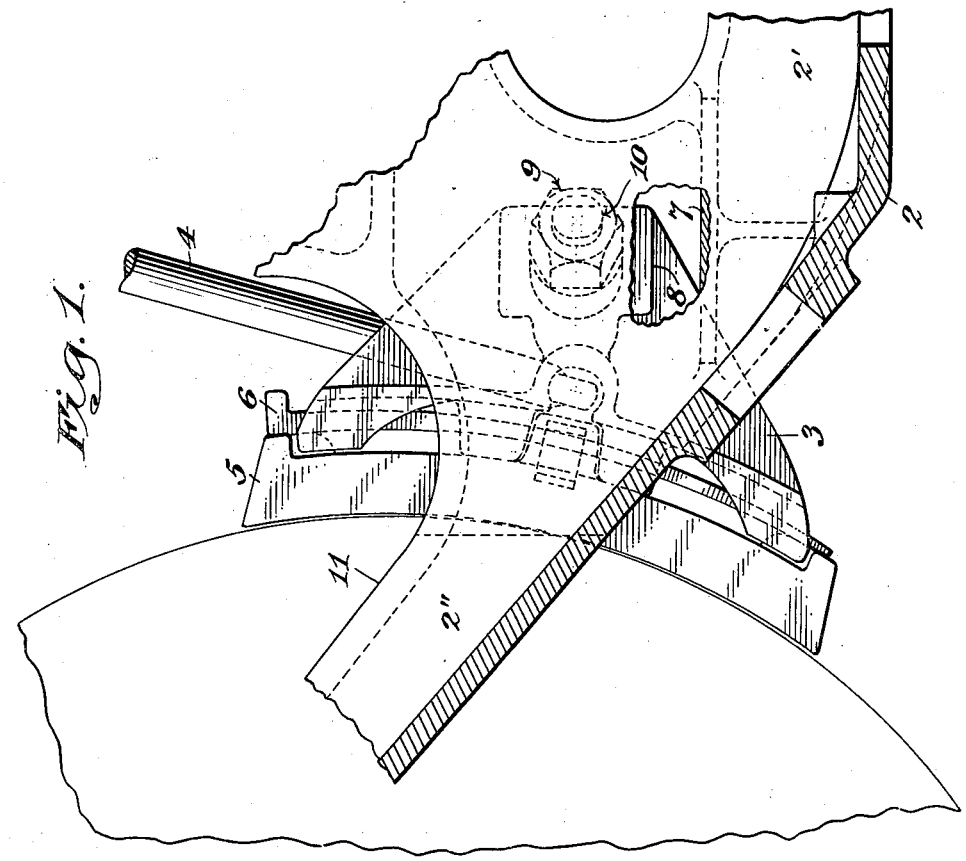
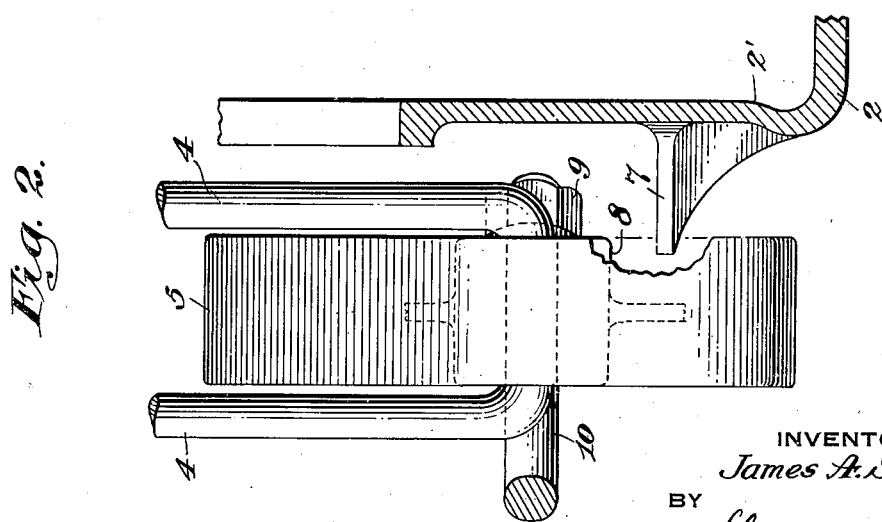
INVENTOR:
James A. Shafer
BY
Clarence B. Kerr
ATTORNEY Patented Oct. 9, 1934

1,975,869

UNITED STATES PATENT OFFICE 1,975,869

SAFETY SUPPORTING MEANS FOR BRAKE BEAMS

James A. Shafer, East Cleveland, Ohio, assignor to National Malleable and Steel Castings Company, Cleveland, Ohio, a corporation of Ohio Application January 27, 1933, Serial No. 653,794

8 Claims. (Cl. 188—210)

This invention is concerned with the supporting of brake beams in the event of failure of their hangers. The object of the invention is the provision of a novel and improved brake beam safety supporting means which is of simplified construction and at the same time reliable and effective in operation. Through my invention there is provided means cooperating with a brake head of standard construction for serving as a safety support for the latter at all points in its range of movements, without requiring any change in said head. Other features of the invention will be more particularly described and claimed hereinafter.

In the accompanying drawing:

Fig. 1 is a view, partly in vertical section and partly in side elevation, of a portion of a car truck equipped with an embodiment of my invention, part of the car truck side frame being broken away.

Fig. 2 is a view in end elevation, with the side frame in transverse vertical section.

Referring to the drawing there is shown at 2 a portion of a car truck side frame of any suitable or known type, from which a brake head 3 is suspended by a hanger 4 in the well-known manner, said head forming a part of a standard or conventional brake beam as is well understood. The brake shoe 5 is retained in position on the head 3 by the customary key 6 in the usual manner. The parts above referred to are all of standard construction.

In carrying out my invention I provide a flange or ledge 7 cast integral with the side frame and projecting laterally therefrom. Said ledge underlies the interior shoulder 8 of the brake head. This ledge is of sufficient length to support the brake head even though the brake shoe is lost and the car wheel is turned down the maximum amount (1¾ inches under present standards) before being discarded. In other words, said ledge is of sufficient extent longitudinally of the truck to act as a safety support throughout the entire longitudinal movement of the brake head. It may be noted that rearward movement of the brake head is limited by engagement of the brake beam with the car truck bolster or spring plank, as will be well understood. Due to the lateral movements of the truck, the overlap between the ledge 7 and the shoulder 8 will not exist at times. However, when the shoulder 8 does not overlap the ledge 7, the latter underlies the nut 9 on the end of the conventional bolt or truss rod 10 which extends through the brake head. If, under these conditions, the brake hanger 4 should fail, the nut 9 would engage the ledge 7 and prevent further downward movement of the brake beam. The ledge 7 is, in short, of sufficient lateral extent to underlie the nut 9 whenever the overlap between said ledge and shoulder 8 is destroyed, and will lie under said nut even when the brake beam is shifted to the extreme limit of its lateral movement in the direction away from said ledge. Thus, at all times the ledge will provide a safety support for the brake beam through cooperation either with the shoulder 8 or nut 9.

It will, of course, be understood that the side frame opposite the frame 2 of the car truck will be provided with a similar ledge 7.

My invention has been illustrated in connection with the type of side frame more particularly shown in my pending application Serial No. 459,480, filed June 6, 1930, wherein the lower portion 2' of the side frame merges with the tension member 2" and forms a tension portion of the frame. It will, at the same time, be apparent that the invention is in no way restricted to any particular type of side frame, and that it is capable of embodiment in car trucks generally.

The brake beam may be removed with marked facility as follows: The brake shoe keys 6 are first removed after which the shoes 5 are disengaged from the brake heads 3. The brake hangers 4 are disconnected and one end of the brake beam raised until the truss rod nut 9 can be pulled into the triangular window opening 11 of the side frame. The opposite end of the beam will then drop off the safety ledge 7 after which the beam can be slid from out of the window opening 11 of the side frame and removed. Thus the removal of very few parts is required, and disassembly of the truck is unnecessary.

If desired, the brake head 5 may also be provided with the key member shown at 10 in my copending application, Serial No. 630,038, filed August 23, 1932, now Patent No. 1,923,120, issued August 22, 1933, whereby support for the brake head in the event of hanger failure may be provided simultaneously at spaced points by said member 10 and the ledge 7. However, the addition of said member is in no way necessary to the effective functioning of the ledge 7 as hereinbefore described.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a car truck, a side frame, a brake head, a hanger supporting said head, said head having an interior shouldered portion, and a projection on said side frame extending into engageable relation to said shouldered portion for supporting said head in the event of failure of said hanger.

2. In a car truck, a side frame, a brake head, a hanger supporting said head, a bolt in said head extending to a point on the exterior of said head, and a projection integral with said side frame and extending laterally therefrom into engageable relation to said bolt for supporting said head in the event of failure of said hanger.

3. In a car truck, a side frame, a brake head, a hanger supporting said head, said head having an interior shouldered portion, a bolt in said head extending to a point on the exterior thereof, and a projection on said side frame extending below said shouldered portion and said bolt for receiving said shouldered portion in the event of hanger failure in a given lateral relation between said side frame and said head and for supporting said head through said bolt in case of hanger failure in another lateral relation between said head and said side frame.

4. In a car truck, a side frame, a brake head, a hanger supporting said head, and means comprising a portion of said side frame for supporting said head through cooperation with an interior portion thereof in the event of failure of said hanger.

5. In a car truck, a side frame, a brake head, a hanger supporting said head, a nut carried by said head and means integral with the side frame and engageable by said nut for supporting said head in the event of failure of said hanger.

6. In a car truck, a side frame, a brake head, a hanger supporting said head, said head having an interior shouldered portion, an element carried by said head and projecting laterally therebeyond, and a ledge on the side frame underlying said shouldered portion and element for receiving said shouldered portion in the event of hanger failure in a given lateral relation between said side frame and said head, and for supporting said head through said element in case of hanger failure in another lateral relation between said head and said side frame.

7. In a car truck, a side frame, a brake head, a hanger supporting said head, said head having an interior shouldered portion, a truss rod extending through said head, and a ledge integral with the side frame extending below said shouldered portion and said truss rod for receiving said shouldered portion in the event of hanger failure in a given lateral relation between said side frame and said head and for supporting said head through said truss rod in case of hanger failure in another lateral relation between said head and said side frame.

8. In a car truck, a side frame, a brake head, a hanger supporting said head, said head having a shouldered portion and a ledge integral with a tension portion of the side frame and extending laterally therefrom into engageable relation to said shouldered portion for supporting said head in the event of failure of said hanger.

JAMES A. SHAFER.